Aug. 21, 1951    A. HOOPER    2,564,976
EDUCATIONAL DEVICE FOR TEACHING ARITHMETIC
Filed Feb. 18, 1949
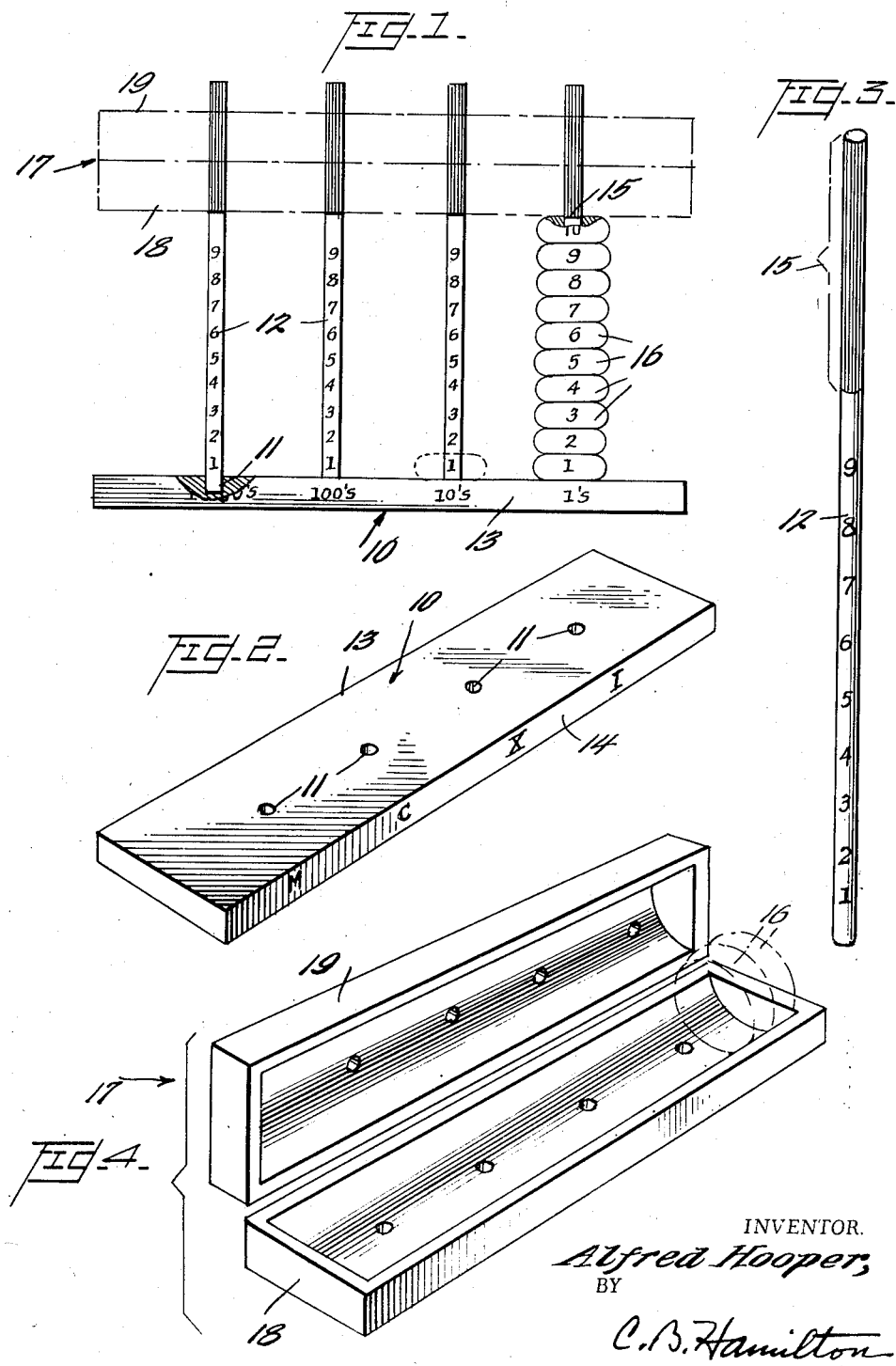
INVENTOR.
Alfred Hooper,
BY
C. B. Hamilton,
Attorney Patented Aug. 21, 1951

2,564,976

UNITED STATES PATENT OFFICE 2,564,976

EDUCATIONAL DEVICE FOR TEACHING ARITHMETIC

Alfred Hooper, Hillcot, Pownal, Vt., assignor of thirty one-hundredths to Cecil B. Hamilton, Falls Church, Va.

Application February 18, 1949, Serial No. 77,224

12 Claims. (Cl. 35—31)

This invention relates to a combined calculator and educational toy, and particularly to such a device used as a game for teaching children to visualize the meaning of written numbers in a concrete fashion and to grasp the principles of carrying and borrowing in addition and subtraction by manual operation instead of by abstract principles.

Difficulty is frequently experienced by parents and also by teachers in the primary school grades in teaching the first basic principles of arithmetic and of giving demonstrations with miscellaneous small objects, such as beads strung on horizontal wires, which are usually unsatisfactory in attempting to overcome abstract ideas not understood by children, since they do not show an actual "picture" of a written number.

An object of the present invention is to provide a simple educational and attractive toy for objectively teaching a child arithmetic according to the decimal and Roman system of notation.

Another object is to provide a calculator to visualize the logic and mechanics involved in grasping the abstract ideas of "carrying" and "borrowing" and of positional or denominational values involved in addition and subtraction.

These and other objects will become evident from the following description when taken in conjunction with the accompanying drawing wherein like reference numerals indicate the same parts throughout the several views.

In the drawing:

Fig. 1 is a front elevational view of the calculating and educational device disclosing one embodiment of the invention;

Fig. 2 is a perspective view of the base showing the reverse side thereof from that disclosed in Fig. 1;

Fig. 3 is an enlarged perspective view of one of the positional or denominational value pegs inserted in the base for receiving the counter discs; and Fig. 4 is a perspective view of a container shown in dotted outline in Fig. 1 in which the counter discs are stored for shipping or when not in use.

In its general aspects the invention contemplates a rectangular base 10 made of wood, plastic, metal or any suitable material, having spaced apertures 11 therein in which are placed denominational pegs or pins 12, which are removable. Opposite each aperture 11, on the longitudinal front face 13 of the base 10 are stamped, from right to left, 1's, 10's, 100's, 1000's, etc., meaning units, tens, hundreds, thousands, etc., respectively, designating the positional or denominational places in the decimal system of notation. On the reverse longitudinal face 14 of the base 10, as shown in Fig. 2, the Roman characters I, X, C and M are stamped opposite the apertures 11 to designate the Roman notation of ones, tens, hundreds and thousands, respectively.

The denominational or positional pegs 12 may be made of wood, plastic, metal or any desirable material and may bear engraved or stamped numbers from 1 to 10 as indicated in Fig. 1. An upper predetermined length 15 of each denominational peg 12 is colored a vivid red so that when ten counters or discs 16 are placed thereon the tenth or top counter will reach or touch the red portion 15. The lower portion of the pegs may also be colored in any desired contrasting colors to indicate the values of the digits from 1 to 9.

The counters 16 can be made in any desired shape and may be constructed of wood, metal, transparent plastic, or other material whereby the numerals 1-10 on the pegs 12 may be seen through the counters. The counters may also be made of an opaque material or of plastic and produced in any color, such as a vivid yellow, to make them attractive to children.

The counters 16 are normally stored inside a container 17 consisting of two trough like trays 18—19 having apertures 20 therein through which pass the denominational pegs 12, as shown in dotted outline Fig. 1, when assembled for display or shipping purposes.

By following simple instructions, a child, while playing with the computing toy of the invention with denominational pegs in columnar arrangement, will readily absorb the concept of the number-scale and also the positional or denominational value on which the decimal system of notation is based. Instead of being confronted with abstract ideas, the child will actually perform with his hands the operations of "carrying" and "borrowing" from column to column and thus grasp in a concrete picture fashion the abstract concepts involved in performing arithmetic.

In the use of the computing toy, the container 17 and all counters 16 are removed from the denominational pegs 12. Those denominational pegs 12, not being used in a particular problem, may be removed from the base 10 to avoid any confusion in a child's mind that they are playing some part in a computation not involving those denominations. Then to add 5 to 9, the child is instructed to place nine counters 16 in stacked relationship on the 1's or units peg to show "9." Five counters are then placed in his hand and he begins to place them one by one on the units or 1's peg on top of the nine already there. As soon as the first of the five is placed on the 1's peg his attention is directed to the fact that it touches the red color 15.

Then an agreement is reached that when a counter first reaches red on a 1's peg, all ten of these counters are removed; one counter is placed on the 10's peg and the other nine discarded. Thus the child is made to understand that one counter on the 10's peg means the same number as ten counters on the 1's peg or, in other words, that one counter on the 10's peg is worth ten times as much as a counter on the 1's or units peg. This is the positional or denominational value on which all written numbers depend. Now one counter is on the 10's (tens) peg and four counters are on the 1's (units) peg, representing the number 14, the sum of 5 and 9, and he will readily see that the written number "14" is merely a "picture" of the counters remaining on the tens and units pegs. The device also demonstrates in a simple, yet striking fashion, the work done by the zero symbol "0". It indicates that "0 counter" is on a certain peg and thus keeps the other written number-symbols in their proper columns, thus 1030 indicates that there is 1 counter on the 1000's peg; 0 counter on the 100's peg; 3 counters on the 10's peg; and 0 counter on the 1's peg. Many other similar exercises can be used with the device in teaching a child.

*Subtraction*

In subtracting 28 from 61 the educational and computing toy is set up to show 61, with 6 counters on the 10's and 1 counter on the 1's pegs. Now, how can 8 counters be taken off the 1's peg that has only one counter on it? By showing the child that the taking of one counter off the 10's peg would make the number 61 ten smaller (51), and that these 10 counters can be placed on the units or 1's pegs. Thus he borrows "1 ten" from the tens peg and pays it back by placing "10 ones" on the units peg. By taking the eight counters of the number 28 from the units peg, three counters now remain on the units peg and five on the tens peg.

Now considering the "2" tens in the number 28, the child takes away two counters from the 5 on the tens peg, leaving 3 thereon. Thus the answer is shown to be 33 when 28 is subtracted from 61. Having grasped the above process of "borrowing" and "paying back," and having worked a number of subtractions involving only the tens and units pegs, he should have no difficulty in applying a similar process to other pegs in handling larger numbers.

This educational device can also be used in a similar manner for computing Roman numerals. The symbols M, C, V, X and I on face 14 of base 10 enables one to see how a Roman added, say, MCCLXXXIX to MCCCVIII or subtracted MCCCCXVII from MMCCCXXXIII.

Although the invention is disclosed in only one embodiment for purpose of illustration, it will be understood that numerous changes and modifications can be made without departing from the scope of the invention as defined by the appended claims.

What is claimed is:

1. In a device for teaching arithmetic, a base, a plurality of spaced vertical denominational pegs held in said base and having the top portion thereof colored over a predetermined length, and removable counters designed to be held by said pegs to represent numbers of different values, said colored portion indicating a carry over when reached by a stack of counters.

2. In a device for teaching notation and numeration, a base divided into sections and marked to represent a series of denominations, a member positioned in each section to represent a particular denomination and having a colored upper portion, and counters adapted to be positioned on the member to indicate numbers and to touch the colored part when ten counters are placed thereon, said touching of the colored part by the tenth counter indicating a carry over.

3. In a computing device and educational game for teaching children numeration and the relation that numbers bear to one another, a base, a plurality of vertical members having digits stamped thereon in ascending order and secured in the base and denoting a series of denominations or positional values, said members having colored portions to indicate carry overs and a plurality of transparent counters adapted to be slidably positioned on the vertical members whereby the digits on said members can be seen through the said counters, a carry over being indicated when a stack of counters on a member reaches the said colored portion thereof.

4. In a counting device to teach children to visualize the meaning of written numbers, a base bearing spaced markings for the denominational columns for Arabic numbers along one side and bearing along another side spaced markings for the denominational columns for Roman numbers, vertical pins positioned upright in the base at said denominational markings thereon to represent denominational positions for digits in any number and colored at predetermined places thereon to represent predetermined digital values, and counters adapted to be slid on and removed over the upper ends of the pins in varying numbers to represent various digital values, a carry over being indicated by a predetermined colored portion on a pin when a stack of counters reaches said colored portion.

5. In a device for teaching arithmetic, a plurality of colored counters to represent digits of different values according to the number of counters used, and a plurality of spaced vertical receptacles having predetermined colored portions and arranged in denominational series to slidably receive in stacked relationship the removable counters in varying numbers according to the digits to be represented and to indicate particular values when the counters touch the said colored portions, a carry over being indicated by a given colored portion of a receptacle when a tenth counter is placed on a stack thereof.

6. In an educational computing device for teaching arithmetic, a base having spaced holes marked to represent denominational or positional values according to a plurality of notational systems, vertical members removably positioned in the holes in the base and finished in contrasting colors of predetermined lengths, and counters removably positioned in stacked relationship on the vertical members to indicate various ranges of digital values according to the colors touched on the vertical members, one of said colors indicating a carry over when a stack of counters reaches it.

7. In a device for teaching arithmetic, a base, vertical members held in spaced relationship in said base and representing a series of denominations, apertured counters adapted to be removably slid onto said vertical members to represent various digits, and a container for storing the counters therein consisting of lower and upper parts and having aligned holes therethrough for receiving the vertical members when the said container is slid thereon.

8. In a device for teaching mathematics, a container consisting of a lower part and an upper part and having aligned holes therethrough, counters stored in the container, and a plurality of vertical receptacles on which the counters are adapted to be stacked to represent numbers of various values and for entering the aligned holes in the container when it is placed thereon.

9. In an educational toy for teaching arithmetic in game and picture form, a base, a plurality of pins removably secured in the base and representing a series of denominational positions for digits of numbers and having colored portions to represent ranges of digital values, a plurality of apertured counters adapted to be slid down over the tops of the pins, one of said colored portions representing a carry over when a stack of counters on a pin reaches that colored portion, and a container for storing the counters therein and removably held by the said pins.

10. In a computing device and educational toy, a base having a series of spaced apertures therein representing various denominational or positional values, markings on the front face of the base opposite each aperture to indicate the particular denominational value thereof according to the decimal system of notation, markings on the rear face of the base opposite each denominational aperture to indicate the particular denominational value thereof according to the Roman system of notation, removable pegs inserted in vertical position within the apertures in the base, each peg being colored a predetermined distance from the top thereof, apertured counters adapted to be placed on and removed from each denominational peg, said colored portion on a peg indicating a carry over when it is reached by a stack of counters, and a storage container for the counters and having holes therethrough for receiving the various pegs when the container is assembled thereon.

11. In an educational device for teaching arithmetic in picture and game form, a base having spaced recesses therein and marked with adjacent characters to represent a plurality of different denominational positions, a plurality of removable members fitted into said recesses and frictionally held in upright positions in said base, each of said upright members having numbers printed thereon in ascending scale and vividly marked at a predetermined position to indicate a particular number and having a colored portion to indicate a carry over, and a plurality of transparent apertured counters adapted to be removably stacked on said upright members to represent numbers and indicating a carry over when a stack of counters on a particular member reaches the said colored portion.

12. In a device for teaching arithmetic, a base having denominational markings at spaced distances thereon, pegs held in upright positions in said base opposite said markings and having different colors thereon over predetermined areas to represent digital values and the position where carry over occurs, a plurality of colored apertured counters adapted for sliding engagement over said upright pegs and to be supported by said base, and means for storing said counters when not in use, said means having spaced apertures for engaging the said pegs when removably assembled thereon.

ALFRED HOOPER.

REFERENCES CITED

The following references are of record in the file of this patent:

UNITED STATES PATENTS

| Number | Name | Date |
|---|---|---|
| 465,811 | Anderson | Dec. 22, 1891 |
| 637,964 | Johsen | Nov. 28, 1899 |
| 2,486,260 | Church | Oct. 25, 1949 |

FOREIGN PATENTS

| Number | Country | Date |
|---|---|---|
| 359,210 | Great Britain | Oct. 22, 1931 |
| 587,220 | Great Britain | Apr. 17, 1947 |